United States Patent [19]

Fluegel

[11] Patent Number: 4,734,590
[45] Date of Patent: Mar. 29, 1988

[54] INTEGRATED DRIVE GENERATOR WITH COMMON CENTER LINE

[75] Inventor: Theodore D. Fluegel, Rockford, Ill.

[73] Assignee: Sundstrand Corporation, Rockford, Ill.

[21] Appl. No.: 947,703

[22] Filed: Dec. 30, 1986

[51] Int. Cl.[4] ............................................. F16H 47/02
[52] U.S. Cl. ..................................... 290/1 C; 290/46; 74/687
[58] Field of Search .............. 290/1 C, 46; 318/9–13, 318/15; 74/687

[56] References Cited

U.S. PATENT DOCUMENTS

| | | | |
|---|---|---|---|
| 4,252,035 | 2/1981 | Cordner et al. | 74/687 |
| 4,278,928 | 7/1981 | Griffiths et al. | 74/687 X |
| 4,310,768 | 1/1982 | Colley | 290/1 C |
| 4,315,442 | 2/1982 | Cordner | 74/687 |
| 4,382,188 | 5/1983 | Cronin | 290/1 C |

Primary Examiner—William M. Shoop, Jr.
Assistant Examiner—W. E. Duncanson, Jr.
Attorney, Agent, or Firm—Wood, Dalton, Phillips, Mason & Rowe

[57] ABSTRACT

An integrated drive generator system in which all of the main components of the system are mounted for operation about a single centerline. A housing mounts a drive input shaft. A differential is coupled to and arranged coaxially of the drive input shaft. A generator is coupled to the differential and includes a rotor coaxially of the drive input shaft. A hydraulic log includes a hydraulic pump and motor assembly coupled to the differential and arranged coaxially of the drive input shaft. An exciter also is employed coaxially of the drive input shaft, surrounding the differential, and a compact cooling system includes cooling passages integral with the housing and in close proximity to the stator of the generator.

24 Claims, 2 Drawing Figures

INTEGRATED DRIVE GENERATOR WITH COMMON CENTER LINE

FIELD OF THE INVENTION

This invention generally relates to integrated drive generator systems and, particularly, to an integrated drive generator system usable in aircraft wherein an aircraft engine conventionally is used as a power source for an electrical generating system of the aircraft.

BACKGROUND OF THE INVENTION

In a conventional integrated drive generator system, a drive shaft connectable to an output shaft driven by an aircraft engine is connected to a mechanical differential, with the differential having an output connected to drive the generator. A variable speed transmission, such as a hydrostatic transmission or log, is associated with the mechanical differential and controlled to modify the output of the differential, as required, whereby the input speed to the generator remains constant even though the speed of the drive shaft may vary. There are a variety of structural arrangements for a constant speed drive and generator system, such as those shown in Baits U.S. Pat. No. 3,576,143 and Aleem U.S. Pat. No. 3,786,696.

The continuing growth of aircraft engine technology demands that accessory components be afforded with lighter, more efficient systems with narrow frontal areas, thereby minimizing aerodynamic drag losses. Serviceability of the accessories also is of growing concern. The integrated drive generator is a primary engine accessory. Conventional integrated drive generators have separate centerlines or axes for the various components thereof, particularly the three main components comprising the differential, the generator and the hydraulic pump and motor assembly, sometimes called the hydraulic log. Problems associated with such integrated drive generators include a fairly large frontal area which increases engine nacelle size and, thus, engine aerodynamic losses; increased heat rejection because of the many rotating surfaces exposed to the oil sump; added weight and servicing requirements associated with cooling and maintaining an independent oil supply; and added weight from part functions not optimally integrated.

This invention is directed to solving the above problems and satisfying the needs of changing aircraft engine technology.

SUMMARY OF THE INVENTION

An object, therefore, of the invention is to provide a new and improved integrated drive generator system wherein the main components thereof are arranged and operatively coupled on a common centerline or axis.

In the exemplary embodiment of the invention, the integrated drive generator system generally includes a housing mounting drive input shaft means. Differential means are coupled to and arranged coaxially of the input shaft means. Generator means are coupled to the differential means and include a rotor coaxially of the input shaft means. Hydraulic log means are coupled to and arranged coaxially of the input shaft means.

In the arrangement of the integrated drive generator system of this invention, the differential means are located axially between the generator means and the hydraulic log means. In other words, the generator means is on one side of the differential means and the hydraulic log means is on the other side, all sharing a common centerline and coaxially operative. The input shaft means extend through the differential means for connection to the hydraulic log means.

More specifically, the differential means include a planetary gearset having an outer, rotary ring gear. The ring gear forms part of a rotary sleeve surrounding the input shaft means carrying the planet gears of the gearset, and connected to the generator rotor. Therefore, the drive input shaft means can extend through the planetary gearset, with the hydraulic log means on a side of the differential means opposite the side of the generator means.

With such a radially compact arrangement, another feature of the invention includes forming cooling passages integral with an interior wall of the housing surrounding the stator of the generator. Therefore, the cooling passages surround and are disposed in close proximity to the periphery of the generator, requiring no additional space because the passages are integral with the housing itself.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
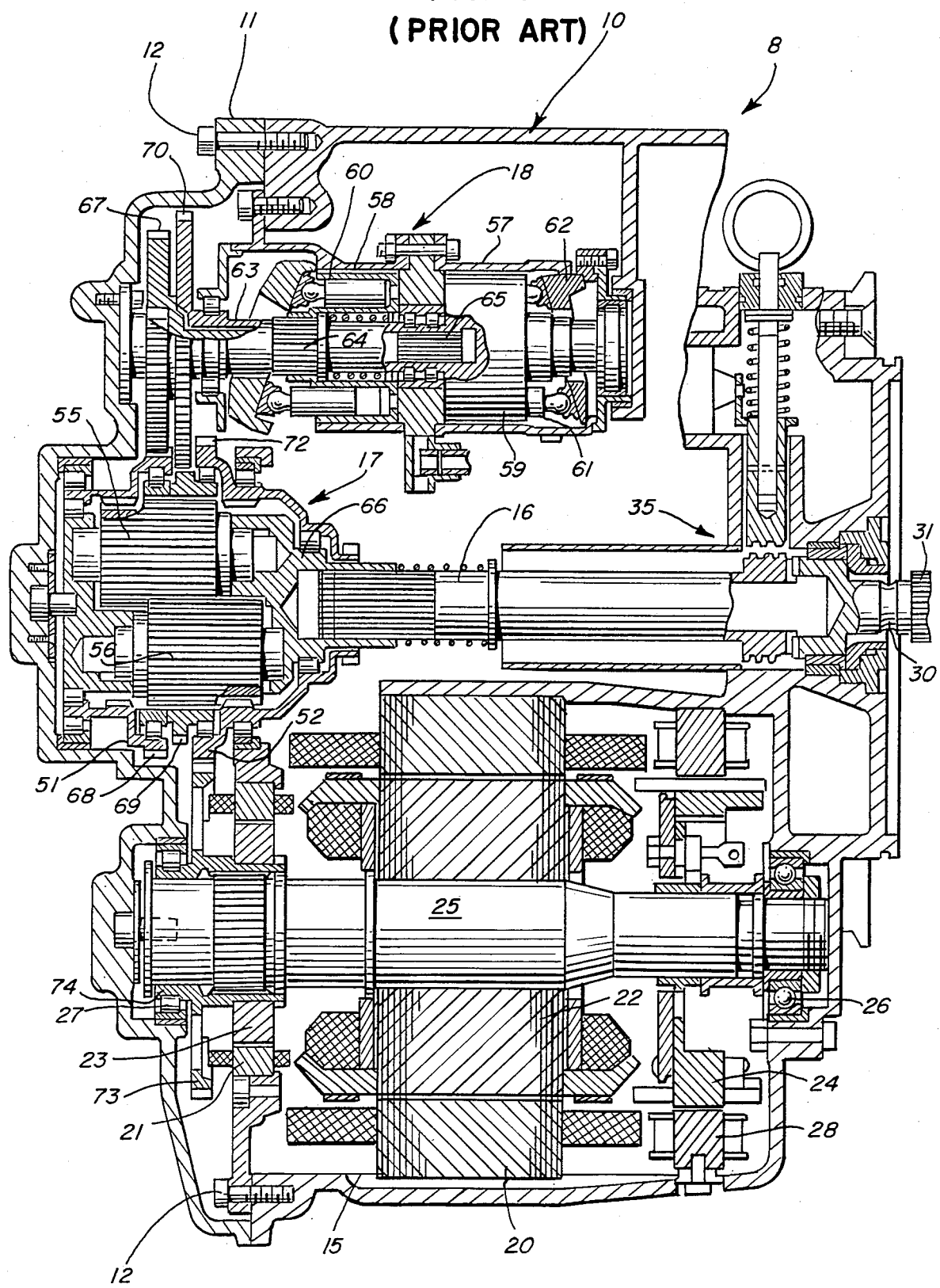
FIG. 1 is a sectional view of an integrated drive generator system according to the prior art.

Referring to the drawings in greater detail, and first to FIG. 1, an integrated drive generator system, generally designated 8, is illustrated according to the prior art. The system shown in FIG. 1 is taken from U.S. Pat. No. 4,252,035 to Cordner et al, dated Feb. 24, 1981, assigned to the assignee of this invention, and which is incorporated herein by reference.

Integrated drive generator system 8 of FIG. 1 includes a housing, generally designated 10, with an enclosing top cover 11 secured thereto by a series of fastening devices 12. Components of the system include an electrical generator, generally designated 15, which is to be operated at a constant speed by means of a drive applied to a drive input shaft 16. The drive does not go directly to the generator, since the speed of input shaft 16 may vary, depending upon the speed of the prime mover, such as an aircraft engine to which the system is connected.

The system further includes a mechanical differential, generally designated 17, and a variable speed transmission, generally designated 18, and which preferably is in the form of a hydrostatic transmission or hydraulic log.

Generator 15 has three stators 20,21,28 operatively associated with rotors 22,23,24, respectively, which have electrical windings associated therewith. Rotors 22,23,24 are mounted on a shaft 25 which has a pair of bearings 26 and 27 positioned at opposite ends thereof and supported within housing 10 whereby the rotors are mounted for rotation relative to the stators.

Drive input shaft 16 receives its drive from a connecting shaft 30 having a splined connection 31 for connection to an output drive from a prime mover, such as an aircraft engine. Rotation of shaft 30 is imparted to drive input shaft 16 through a quick-disconnect structure, generally designated 35, which is of a type known in the art.

Mechanical differential 17 has a pair of annular spaced-apart ring gears 51 and 52 meshed with pinion gears 55 and 56, respectively.

Variable speed transmission 18 is shown as a hydrostatic transmission having hydraulically-connected coaxial units. These units are axial piston units and one unit is a fixed displacement pump/motor 57 while the other unit is a variable displacement pump/motor 58. Each of the units is of the same basic structure, including rotatable cylinder blocks 59 and 60, respectively, in which pistons reciprocate under the control of a swash plate 62. Pump/motor 57 has pistons 61 under the control of a swash plate 62 which is well known in the art. Cylinder block 60 of pump 58 is driven through an element of the mechanical differential which is connected to a tubular quill shaft 63 which is splined to cylinder block 60, as shown at 64. Fixed displacement pump/motor 57 drives an element of the differential through a shaft 65 which is splined to cylinder block 59 of the pump/motor and which extends through tubular quill shaft 63 to a point of drive connection to the mechanical differential.

Lastly, mechanical differential 17 has two drive input connections and two drive output connections. The first drive input connection is that of a carrier 66 to drive input shaft 16. The second drive input connection is from fixed displacement unit 57 of the hydrostatic transmission by rotation of shaft 65 which has a gear 67 in mesh with teeth of an external gear 68 on ring gear 51. The first drive output connection from the mechanical differential is from the external gear teeth 69 on the carrier which meshes with a gear 70 on tubular quill shaft 63 to provide a direct input from the input drive shaft 16 to variable speed unit 58. The second drive output connection is from ring gear 52 which has an external gear 72 which meshes with a gear 73 carried by a member 74 which is internally splined to rotor shaft 25 of generator 15.

Other details of integrated drive generator 8 can be derived from the aforesaid U.S. Pat. No. 4,252,035. However, it can be seen that hydraulic log or variable speed transmission 18, like generator 15, is operative on a centerline or axis offset from input drive shaft 16. In addition, it immediately can be seen that the number of gear connections between the various components is quite significant.

Figure 2:
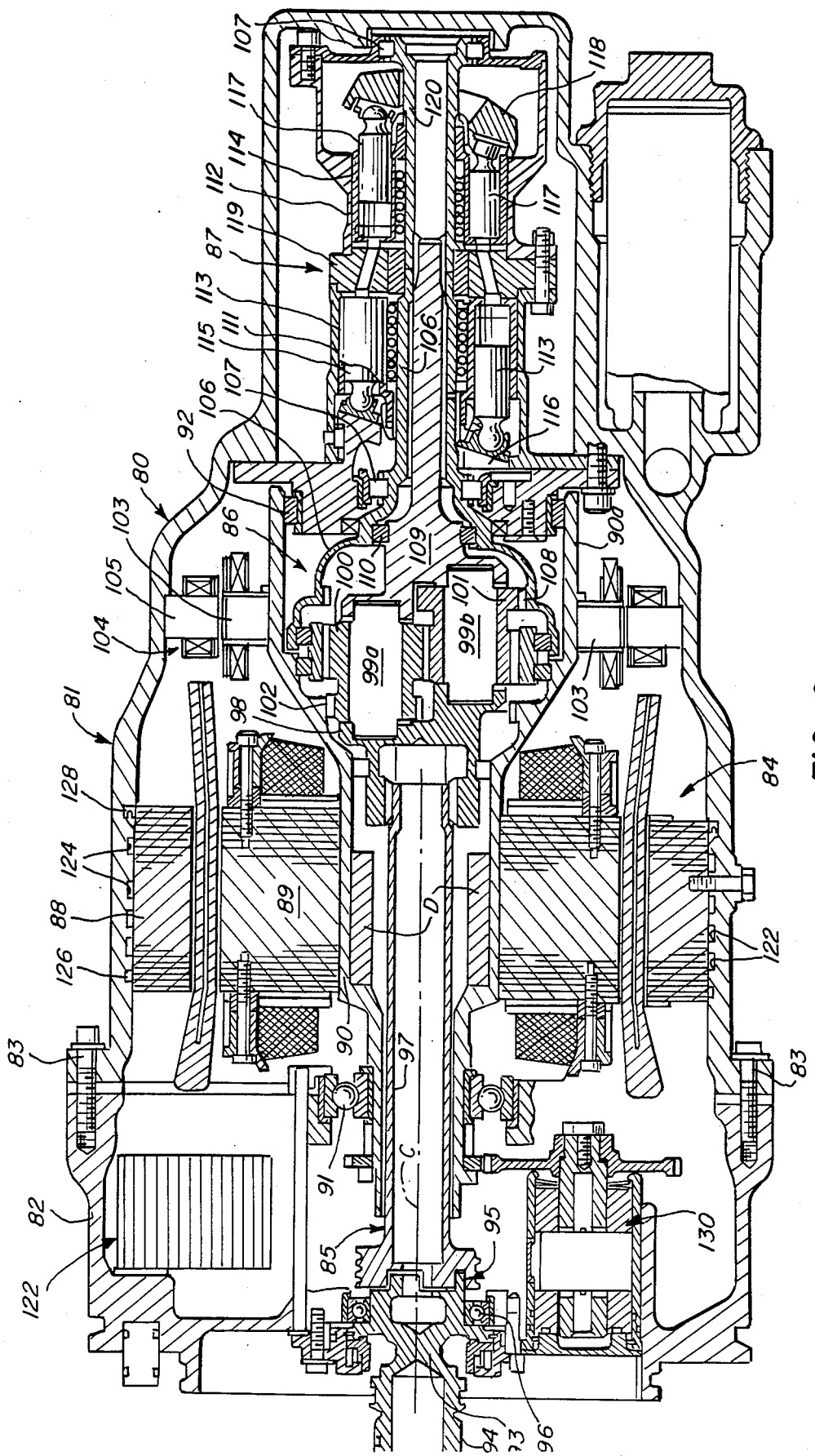
FIG. 2 is a sectional view of an integrated drive generator system of the invention.

FIG. 2 shows a single centerline or coaxial integrated drive generator, generally designated 80, according to the invention. The integrated drive generator system has a housing, generally designated 81, with an enclosing cover 82 secured thereto, as by a series of fastening devices 83. In essence, integrated drive generator system 80 includes all of the main components of integrated drive generator 8 (FIG. 1) but eliminates many of the geared connections and provides a novel system wherein the major components are coupled or connected and operative about a single centerline "C", with the components coaxially driven.

More particularly, the main components include an electrical generator, generally designated 84, which is to be operated by a constant speed by means of a drive applied to a drive input shaft means, generally designated 85. The drive does not go directly to generator 84, since the speed of input shaft means 85, as described above in relation to FIG. 1, may vary dependent upon the speed of the aircraft engine to which the system is connected.

The system includes a mechanical differential, generally designated 86, and a hydraulic log or variable speed transmission, generally designated 87.

Generator 84 includes a stator 88 associated with a rotor 89. Rotor 89 is mounted on a rotary sleeve 90 which has a bearing 91 and a bearing 92 positioned generally at opposite ends thereof and supported whereby the rotor is mounted for rotation relative to the stator. A diode rectifying package "D" is mounted internally of and integral with rotary sleeve 90.

Drive input shaft means 85 receives its drive from a connecting shaft 93 having a splined connection 94 located externally of housing 81,82 for connection to an output drive from a prime mover, such as an aircraft engine. Rotation of shaft 93 is imparted to drive input shaft means 85 through a quick-disconnect structure, generally designated 95. Connecting shaft 93 is journalled within the housing by a bearing 96.

At this point, it should be understood that the input drive shaft means is generally designated 85 at the outset because the drive shaft "means" extends operatively through the entire system, yet includes separate interconnected or coupled components. The drive input shaft means includes a drive input shaft 97 which, itself, is connected to connecting shaft 94.

Mechanical differential 86 has a carrier 98 which carries journal shafts 99a and 99b for a pair of planet gears 100 and 101, respectively. Planet gear 100 is in mesh, as at 102, to rotary sleeve 90 which may be called a shaft and, in essence, comprises a ring gear for the planetary gearset. Therefore, the output ring gear of the planetary gearset comprises the generator shaft for rotor 89 through the means of rotary sleeve 90 which projects axially toward the input end of the system, surrounding and coaxially with input drive shaft 97.

Rotary sleeve 90 also has an enlarged portion 90a fixed to a rotor 103 of an exciter, generally designated 104 and which includes a stator 105. Therefore, it immediately can be seen that exciter 104 also is coaxially mounted about input shaft 97, with the rotor 103 of the exciter being rotated by rotary ring gear means 102 (90).

Mechanical differential 86 also has a fixed block shaft 106 journalled within housing 81 by bearings 107 and includes a trimming ring gear portion 108 meshed with planet gear 101. A carrier shaft 109 is journalled within block shaft 106 by bearings 110 and, in combination with carrier 98, moves planet gears 100,101 in their orbital paths about the centerline "C".

Variable speed transmission 87 is shown as a hydrostatic transmission having hydraulically connected coaxial units. These units are axial piston units and one unit is a fixed displacement pump/motor 111 while the other unit is a variable displacement pump/motor 112. Each of the units is of the same basic structure, including rotatable cylinder blocks 113 and 114, respectively, in which pistons reciprocate under the control of a swash plate.

Pump/motor 111 has pistons 115 under the control of a swash plate 116 which is at a fixed angle while the pump/motor has pistons 117 whose stroke is controlled by a swash plate 118 which is mounted to have its angle varied by control structure, not shown, but which is well known in the art. A port plate 119 is disposed between pump/motor 111 and pump/motor 112. While shaft 106 comprises a fixed block shaft, a variable block shaft 120 is splined to carrier shaft 109. Therefore, variable block shaft 12 is driven through mechanical differential 86 and is effective to rotate cylinder 114 of pump/motor 112. In essence, variable speed hydrostatic transmission 87 comprises a hydraulic log which adds or subtracts horsepower through the differential in the system performing the same functions as variable speed transmission 18 (FIG. 1), yet transmission 87 is operative about the centerline "C" of the system coaxially with the other major components, namely generator 84 and differential 86.

Another feature of the invention is the provision of a compact cooling means for generator 84 which is afforded by the narrow radial dimensions of housing 81. More particularly, a compact cooling package, generally designated 122, communicates through passages (not shown) with a plurality of circumferential passage means 124 integral with housing 81, surrounding and in close proximity to stator 88 of generator 84. Seals 126 and 128 are provided at opposite axial ends of the area bounding passage means 124. In essence, the passage means 122 are disposed in the interior wall of housing 81 surrounding stator 88.

A scavenge pump, generally designated 130, also may be provided within integrated drive generator 80 within the compact radial bounds of housing 81.

From the foregoing, it can be seen that each of the main components of integrated drive generator 80, namely generator 84, differential 86 and hydraulic log 87, as well as exciter 104, all are arranged coaxially about centerline "C" of the integrated drive generator and directly or indirectly coupled to input shaft means 85, including drive input shaft 97. Many of the gears of conventional integrated drive generators, such as that shown in FIG. 1, have been eliminated and replaced by axial shaft means, such as input shaft 97, rotary sleeve or ring gear shaft 90, carrier 98, carrier shaft 109, fixed block shaft 106 and variable block shaft 120. In essence, a great portion of the rotating hardware of prior integrated drive generators has been eliminated to thereby increase efficiency by eliminating considerable churning losses. The simplicity of the design is readily apparent, and considerable expenses in machining all the parts of the integrated drive generator is made more simple and exact since the machining can be set up in reference to a single centerline. All of these advantages are afforded in addition to satisfying the demands of aircraft engine technology that accessory components be made lighter and more efficient with narrow frontal areas, thereby minimizing aerodynamic drag losses.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:

1. An integrated drive generator system, comprising a housing mounting drive input shaft means, differential means coupled to and arranged coaxially of the drive input shaft means, generator means coupled to the differential means and including a rotor coaxially of the drive input shaft means, and hydraulic log means coupled to the differential means and arranged coaxially of the drive input shaft means.

2. The integrated drive generator system of claim 1 wherein said differential means are located axially between the generator means and the hydraulic log means.

3. The integrated drive generator system of claim 2 wherein said input shaft means extend through the differential means for connection to the hydraulic log means.

4. The integrated drive generator system of claim 3 wherein said differential means include rotary sleeve means about the input shaft means, the rotary sleeve means being connected to the generator rotor.

5. The integrated drive generator system of claim 4 wherein said differential means include a planetary gearset, and said rotary sleeve means is defined in part by a ring gear of the planetary gearset.

6. The integrated drive generator system of claim 1 wherein said hydraulic log means comprises a hydraulic pump and motor assembly.

7. The integrated drive generator system of claim 1 wherein said housing surrounds the generator means in close proximity to the periphery thereof, and including cooling passage means integral with the housing about the generator.

8. The integrated drive generator system of claim 7 wherein said generator means include a stator about the rotor, with said integral cooling passage means being disposed in an interior wall of the housing surrounding the stator.

9. The integrated drive generator system of claim 1, including exciter means surrounding and arranged coaxially of the drive input shaft means.

10. The integrated drive generator system of claim 1 wherein said differential means include a planetary gearset having outer, rotary ring gear means coupled to the rotor of the generator.

11. The integrated drive generator system of claim 10, including exciter means having a rotor, the rotor of the exciter means being connected to said rotary ring gear means coaxially of the input shaft means.

12. An integrated drive generator system, comprising a housing mounting drive input shaft means, mechanical differential means coupled to and arranged coaxially about the drive input shaft means, generator means coupled to the mechanical differential means on one axial side of the differential means and including a rotor coaxially of the input drive shaft means, and a hydraulic log means coupled to the differential means on an opposite axial side of the differential means and including a hydraulic pump and motor assembly arranged coaxially of the input drive shaft means.

13. The integrated drive generator system of claim 12 wherein said input shaft means extend through the differential means for connection to the hydraulic log means.

14. The integrated drive generator system of claim 13 wherein said differential means include rotary sleeve means about the input shaft means, the rotary sleeve means being connected to the generator rotor.

15. The integrated drive generator system of claim 14 wherein said differential means include a planetary gearset, and said rotary sleeve means is defined in part by a ring gear of the planetary gearset.

16. The integrated drive generator system of claim 12 wherein said housing surrounds the generator means in close proximity to the periphery thereof, and including cooling passage means integral with the housing about the generator.

17. The integrated drive generator system of claim 16 wherein said generator means include a stator about the rotor, with said integral cooling passage means being disposed in an interior wall of the housing surrounding the stator.

18. The integrated drive generator system of claim 12, including exciter means surrounding and arranged coaxially of the drive input shaft means.

19. The integrated drive generator system of claim 12 wherein said differential means include a planetary gearset having outer, rotary ring gear means coupled to the rotor of the generator.

20. The integrated drive generator system of claim 19, including exciter means having a rotor, the rotor of the exciter means being connected to said rotary ring gear means coaxially of the input shaft means.

21. An integrated drive generator system comprising a housing mounting drive input shaft means, and including differential means, generator means and hydraulic log means, each of the differential means, generator means and hydraulic log means being mounted within the housing coaxially of the drive input shaft means.

22. The integrated drive generator system of claim 21, including exciter means surrounding and arranged coaxially of the drive input shaft means.

23. The integrated drive generator system of claim 21 wherein said differential means include a planetary gearset having outer, rotary ring gear means coupled to the rotor of the generator.

24. The integrated drive generator system of claim 23, including exciter means having a rotor, the rotor of the exciter means being connected to said rotary ring gear means coaxially of the input shaft means.

* * * * *